Dec. 3, 1968  B. C. FORD  3,413,866
BELT TENSIONING DEVICE
Filed Oct. 14, 1966  3 Sheets-Sheet 1

INVENTOR
Byron C. Ford

BY *Cecil L. Ford*

ATTORNEY

Dec. 3, 1968     B. C. FORD     3,413,866
BELT TENSIONING DEVICE
Filed Oct. 14, 1966     3 Sheets-Sheet 2

INVENTOR
Byron C. Ford

BY Cecil L. Ford

ATTORNEY

Dec. 3, 1968    B. C. FORD    3,413,866
BELT TENSIONING DEVICE

Filed Oct. 14, 1966    3 Sheets-Sheet 3

INVENTOR
Byron C. Ford

BY

ATTORNEY

United States Patent Office 3,413,866
Patented Dec. 3, 1968

3,413,866
BELT TENSIONING DEVICE
Byron C. Ford, Rte. 2, Lockney, Tex. 79241
Filed Oct. 14, 1966, Ser. No. 586,791
1 Claim. (Cl. 74—242.11)

ABSTRACT OF THE DISCLOSURE

A spring biased tensioning device for belts, as between a prime mover and a driven mechanism, whereby the belt can be maintained at proper operative tension semi-automatically, as by the application of tension to the belt at the moment when the initial or starting "pull" is exerted, and maintaining such tension until the prime mover is stopped.

Summary of the invention

This invention relates to a tensioning device for belts for driving machinery, as between a prime mover and a driven mechanism, and it has particular reference to a semi-automatic assembly whereby a driven belt can be maintained under desired tension at all times.

It is common practice to provide a weighted or spring biased idler pulley at some point along the belt between the prime mover and driven mechanism whereby a constant tension is applied to the belt to eliminate slack and to insure suitable friction engagement with the operating pulleys. Such devices, while effective, often require adjustment and substantial attention to promote efficient operation and to avoid the lost motion resulting from a lack of tension on the belt.

In some belt driven assemblies, such as that employed in automotive mechanisms which include a generator driven by a V-belt arranged about a fan pulley, the driven generator, or other device, may be mounted on a pivotal bracket whereby it may be adjusted with respect to the driving pulley according to the degree of belt tension required for an efficient function. Such an arrangement, although universally practiced, is not always satisfactory due to a tendency of the pivotal attachment of the driven apparatus to become loosened causing the belt to slacken and render the driven mechanism inoperative.

A belt of whatever character arranged between a driving pulley and a driven one tends to slacken on the side traveling in the direction opposite the driving element, especially upon the initial movement, due to the pull exerted by the prime mover when starting the driven device. Weighted or spring tensioned apparatus, including an idler pulley, will reduce the normal slack in the belt but will yield according to the impelling force of the driving mechanism. A momentary slackening will occur in the side of the belt opposite that on which the initial "pull" is exerted.

A prime object of the invention, therefore, resides in the provision of a mechanism capable of automatic action, responsive to the movement of the belt, and become fixed and rigidly resist any tendency thereof to slacken after the prime mover is in motion .

A further object of the invention is that of providing a device which is simple in structure and design and capable of maintaining a constant tension on most belts whether V-belts or flat belts, and by the use of which suitable belt tension can be attained automatically.

Yet another object of the invention is in the provision of an assembly which involves the utilization of a spring for extending an idler pulley to engage the belt on its slackened side while providing frictional means by which the idler pulley is restrained from yielding under the tension applied to the belt while the latter is in motion.

Description of the drawings

While the foregoing objects are paramount, other and lesser objects will become apparent as the description proceeds, when considered in connection with the appended drawings wherein.

Detailed description

Figure 1:
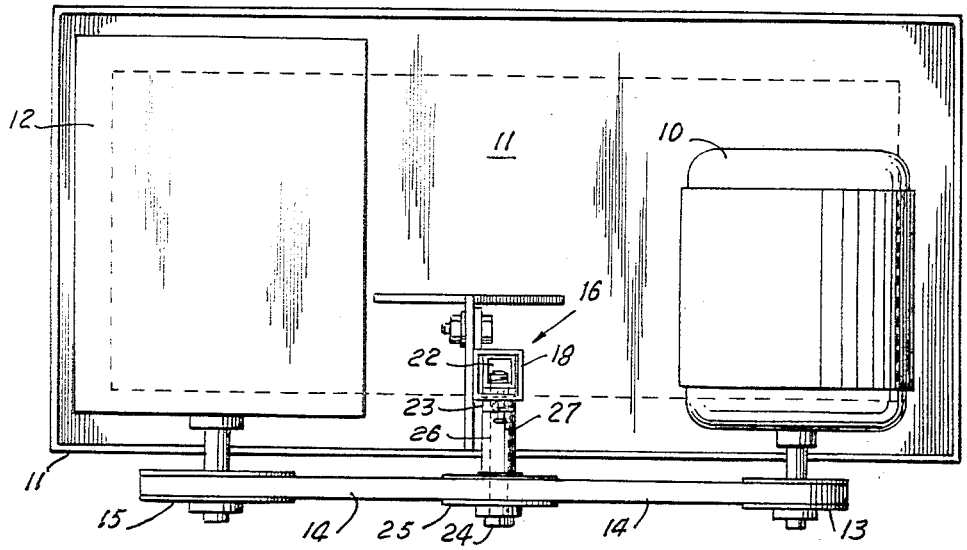
FIGURE 1 is a top plan view showing the invention as applied to an assembly which includes an electric motor and an appliance mounted on a platform and connected by a V-belt.
Figure 2:
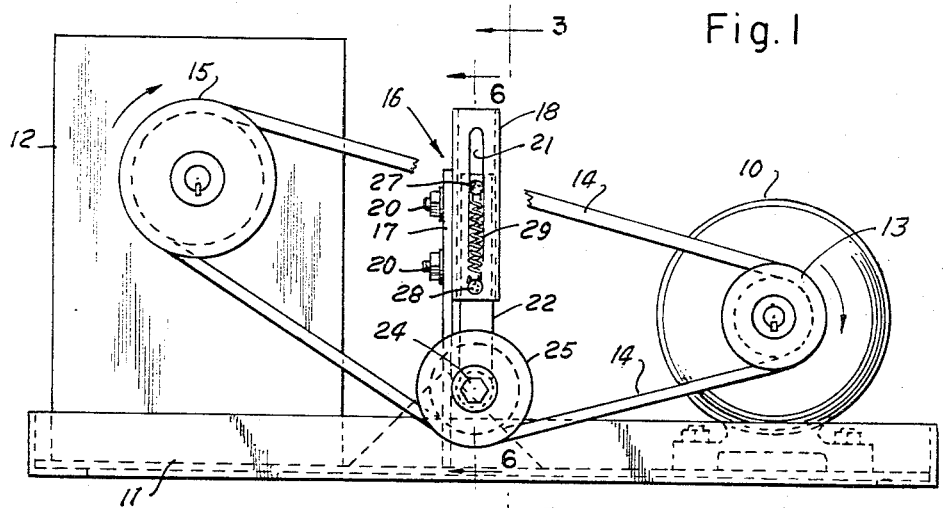
FIGURE 2 is a side elevational view.
Figure 3:
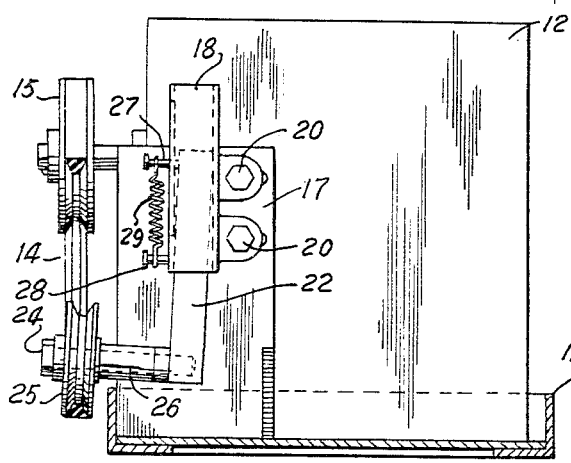
FIGURE 3 is a sectional elevational view taken on the line 3—3 of FIGURE 2.

In FIGURES 1 and 2 is illustrated a typical application of the invention and shows a motor 10 mounted on a base 11 having a driving connection with a mechanism 12 which may be any of several types, such as an air compressor, or other device, mounted on the base 11. A pulley 13 is arranged on the motor shaft and a V-belt 14 provides a driving connection between the pulley 13 and a corresponding pulley 15 on the shaft of the driven device 12.

Figure 4:
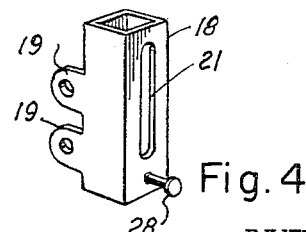
FIGURE 4 is a perspective view showing the outer telescoping tubular member embodied in the invention.

The invention, generally designated by the numeral 16, for the purpose of illustration, is supported on a vertical standard 17 on the base 11 and comprises a sleeve 18, shown in perspective in FIGURE 4, and which is rectangular in transverse section, is formed with integral ears 19 on one side by which it is secured by bolts 20 to the standard 17. A longitudinal slot 21 is formed in the member 18 opposite the ears 19, whose function will become apparent as the description proceeds.

Figure 5:
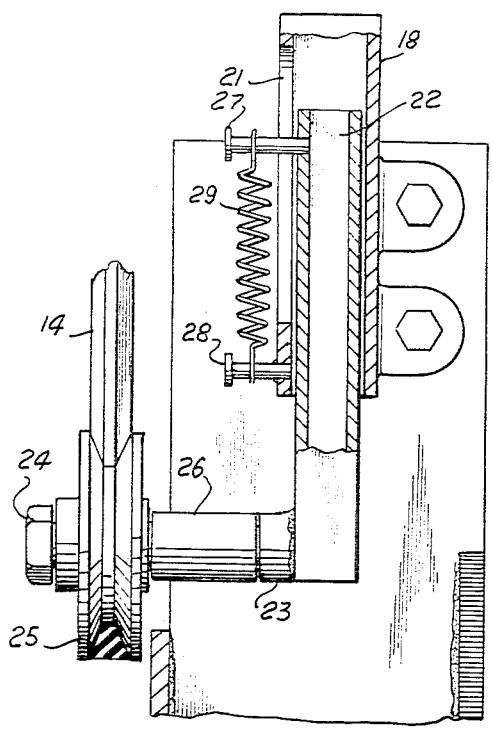
FIGURES 5 and 6 are sectional elevational views on an enlarged scale, both taken on the line 6—6 of FIGURE 2, showing the invention in different operating positions.
Figure 6:
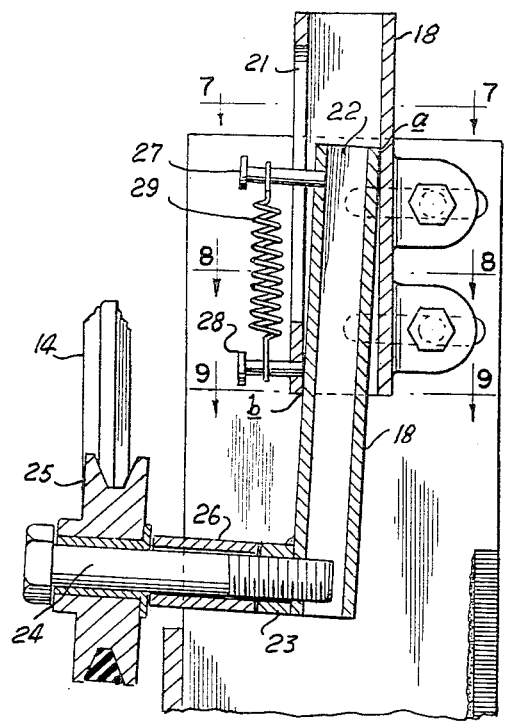
Figure 7:
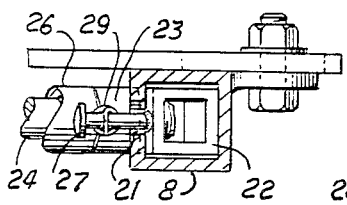
FIGURES 7, 8 and 9 are sectional plan views taken on the lines 7—7, 8—8, and 9—9 of FIGURE 6, respectively.
Figure 8:
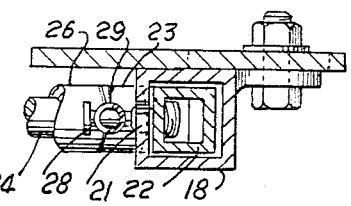
Figure 9:
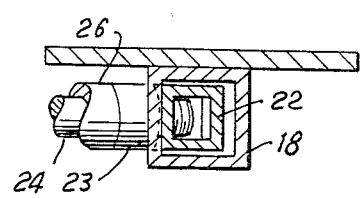
Figure 10:
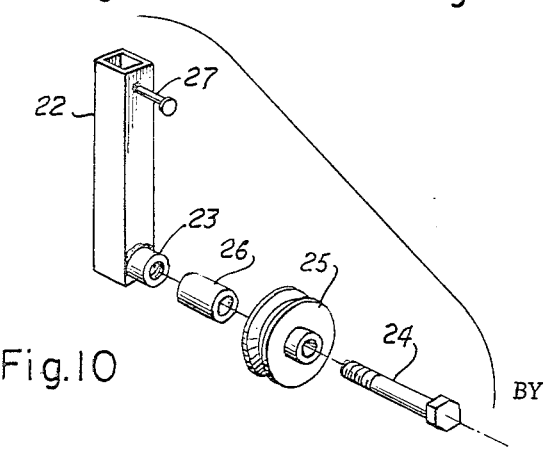
FIGURE 10 is an exploded perspective view showing a portion of the apparatus including the inner telescoping tubular member and showing the idler pulley and its mounting posts.

A tubular shank 22, also rectangular in transverse section, is telescopically received in the member 18, and having a lesser dimension than the internal dimension of the latter, the shank 22 is capable of some lateral inclinations, therein, as shown in FIGURES 6, 7 and 9. An internally threaded boss 23 is welded to the outer end of the member 22 to threadedly receive the inner end of a bolt 24 which functions as a shaft for an idler pulley 25, a spacer sleeve 26 being arranged on the bolt 24 between the pulley 25 and the boss 23, as best shown in FIGURES 5 and 6. The bolt 24 extends laterally at right-angles to the axis of the shank 22.

The shank 22 has a pin 27 secured in its inner end and projecting at right-angles therefrom through the slot 21 in the sleeve 18, which also has a corresponding pin 28 at its outer end aligned with the slot 21 therein, and a pull spring 29 is attached at each end to the respective pins 27 and 28, as shown in FIGURES 5 and 6, capable of biasing the shank 22 within the member 18 toward its outer end and thus causing the pulley 25 to move outwardly against the belt 14, in the manner shown in FIGURE 6, whereupon the inner element 22 is disaligned within the sleeve 18 and, under the tension applied to the belt 14, frictionally engages the inner walls of the sleeve 18 at *a* and *b*, in the manner shown in FIGURE 6, assuming a rigid position until slack occurs in the belt 14.

Figure 11:
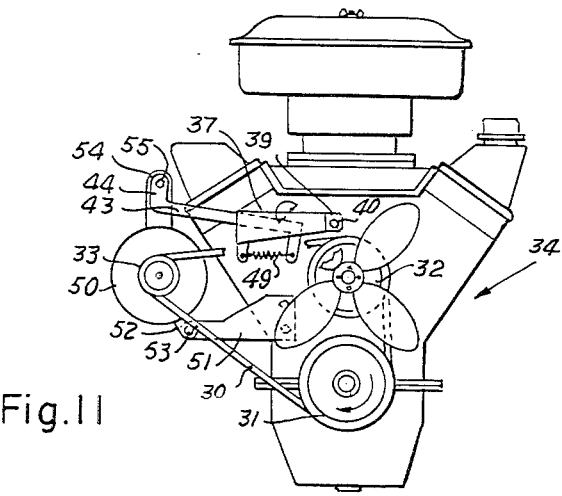
FIGURE 11 is a front elevational view showing a modified form of the invention as applied to an assembly which includes an automobile engine having a fan and an electric generator driven by a common belt, and arrangement of pulleys, from the crank shaft of the motor.

A modified form of the invention is shown in FIGURES 11 to 14, inclusive, and is best adapted to serve the function of maintaining proper tension on the V-belt 30 which is arranged about the pulleys 31, 32 and 33 on the crankshaft of an automotive engine 34, the fan shaft 35 and the generator shaft 36, respectively, as illustrated in FIGURE 11.

Figure 13:
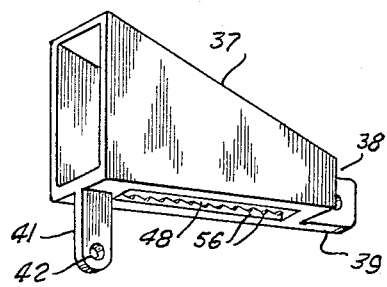

In the application of the invention shown in FIGURE 11 the outer element 37, which is illustrated in perspective in FIGURE 13, and corresponds to the sleeve 18 shown in FIGURES 1 through 10, is rectangular in transverse section and is tapered toward its closed end 38 on which is formed an apertured lug 39 by which it is secured by a bolt 40 to the motor 34. A lateral lug 41, having an aperture 42 in its outer end, is formed on the underside of the member 37, as shown in FIGURE 13.

Figure 12:
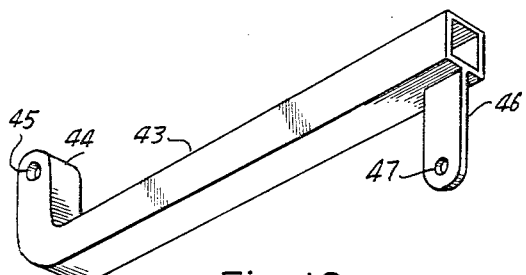
FIGURES 12 and 13 are perspective views on an enlarged scale showing, respectively, the mutually telescoping tubular members of the device shown in FIGURE 11.

The link 43, which is telescopically received in the member 37, is tubular and rectangular in transverse section, as shown in perspective in FIGURE 12. The outer end 44 of the link 43 is bent at right-angles upwardly from the plane of its normal operative position, and an aperture 45 is formed near its extremity.

Figure 14:
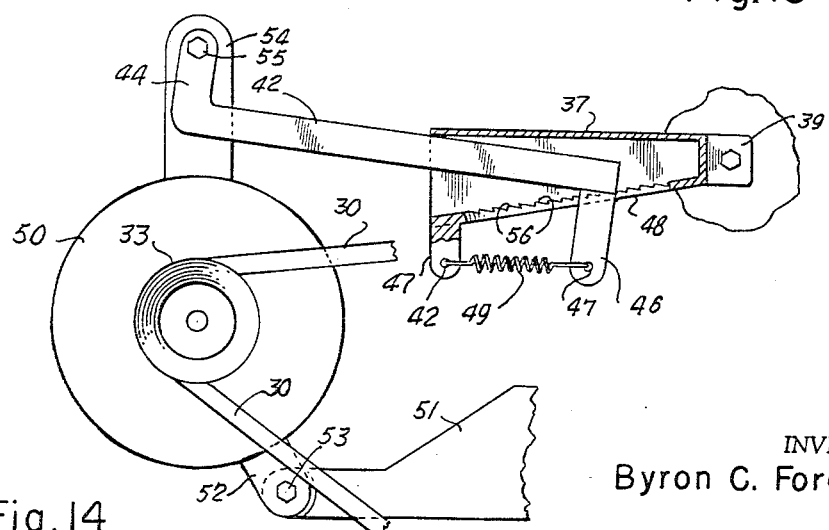
FIGURE 14 is a fragmentary view on an enlarged scale, and partially in section, showing portions of the apparatus as illustrated in FIGURE 11.

A lug 46 is welded to the underside of the link 43, at its inner end, and an aperture 47 is provided near the outer end of the lug 46, the latter being arranged through a longitudinal slot 48 in the underside of the member 37 when the link 43 is in operative assembly, as shown in FIGURES 11 and 14, a pull spring 49 being connected at each end of the lugs 41 and 46, respectively, through the apertures 42 and 47.

The arrangement of the pulleys shown in FIGURE 11 is conventional. The generator 50 is pivotally supported on a bracket 51 secured to the motor 34 and has a lug 52 on its underside by which it is connected to the bracket 51 through a bolt 53 arranged through the lug 52 and the bracket 51 and on which the generator 50 can pivot outwardly away from the motor and thus tighten the belt 30. An apertured bracket 54 is rigidly secured to the top of the generator 50 to which the outer end 44 of the member 43 is pivotally connected by a bolt 55, as shown in FIGURES 11 and 14.

The usual manner of tightening the belt 30 by which the fan shaft and the generator 50 are driven is that of loosening the bolt 53 by which the generator 50 is secured to the bracket 51 and urging the generator 50 outwardly against the belt 30 until proper tension is attained and then tightening the bolt 53. Such procedure is unnecessary when the invention is utilized since by pivoting the generator outwardly in the usual manner, the link 43 being attached thereto through the bracket 54, the inner end of the link 43 will engage one pair of a dual arrangement of serrations 56, a series of which is formed on each side of the slot 48 in the member 37, and restrain the generator 50 from yielding under the tension of the belt 30. This arrangement is shown in FIGURE 14. The provision of the serrations 56, however, is optional.

The "binding" action which occurs by reason of the axial disalignment of the telescopic members, and described as a "frictional" contact as at *a* and *b* in FIGURE 6, is brought about by a transfer of the direction of force applied along the longitudinal axis of the assembly, and the resistance increases in proportion to the force applied, especially at the contact *a*. It is apparent that when a greater degree of disalignment occurs between the associated elements the binding action will be increased accordingly.

The tension applied to the belts 14 and 30 by the idler pulley 25, or the extended link 43, can be relieved manually by releasing the respective members 22 and 43 to cause these elements to be retracted into their respective co-members 18 and 37.

The invention may obviously be modified in structure and design, by persons skilled in the art, without departing from the spirit and intent thereof or the scope of the appended claim.

What is claimed is:
1. In a device for maintaining tension on a driven belt between a prime mover and a driven mechanism, an extensible mounting for an idler pulley engageable with said belt, in combination with said idler pulley, a stationary tubular member rectangular in transverse section, supported in operative associaiton with said belt comprising a sleeve having a longitudinal slot in one of its sides, a second tubular extensible member, rectangular in transverse section, telescopically received in said sleeve at one end and having a shaft extending at right-angles therefrom at its opposite end, the said extensible member having a pin at its inner end extending through the slot in said sleeve, the said idler pulley being rotatively mounted on said shaft and engageable with said belt, a pin on the outer end of said sleeve opposite said pin on said extensible member, and a pull spring connecting said pins whereby to bias said extensible member longitudinally of said sleeve and toward said belt, the said extensible member having a dimension substantially less than the internal dimension of said sleeve whereby said extensible member is subjected to axial disalignment therewith and to frictional engagement with opposing sides thereof.

References Cited
UNITED STATES PATENTS

| | | | |
|---|---|---|---|
| 782,978 | 2/1905 | Magruder | 74—227 |
| 1,317,150 | 9/1919 | Allmand et al. | 74—227 |
| 1,582,516 | 4/1926 | Gibson. | |
| 2,554,738 | 5/1951 | Hager et al. | 74—242.11 |
| 2,734,386 | 2/1956 | Schroeder | 74—242.14 XR |
| 3,151,857 | 10/1964 | Falkenberg | 74—242.14 XR |
| 3,179,242 | 4/1965 | Mayrath | 74—242.14 XR |
| 3,309,783 | 3/1967 | Worst. | |

FRED C. MATTERN, JR., *Primary Examiner.*

J. A. WONG, *Assistant Examiner.*